United States Patent
Glipa et al.

(10) Patent No.: US 9,231,258 B2
(45) Date of Patent: Jan. 5, 2016

(54) COOLING SYSTEM FOR A FUEL CELL

(75) Inventors: Xavier Glipa, Verneuil sur Seine (FR);
Sadok Garnit, Le Plessis Robinson (FR); Eric Pinton, Echirolles (FR); Patrick Le Gallo, Saint Apolinard (FR); Fabien Harel, Giromagny (FR); Sylvie Begot, Chaux (FR); Jean-Marc Le Canut, Belfort (FR)

(73) Assignees: PEUGEOT CITROEN AUTOMOBILES SA, Route de Gisy, Velizy Villacoublay (FR); COMMISSARIAT A L'ENERGIE ATOMIQUE ET AUX ENERGIES ALTERNATIVES, Batiment le Ponant, Paris (FR)

( * ) Notice: Subject to any disclaimer, the term of this patent is extended or adjusted under 35 U.S.C. 154(b) by 228 days.

(21) Appl. No.: 13/981,573

(22) PCT Filed: Feb. 1, 2012

(86) PCT No.: PCT/FR2012/050221
§ 371 (c)(1),
(2), (4) Date: Oct. 2, 2013

(87) PCT Pub. No.: WO2012/104553
PCT Pub. Date: Aug. 9, 2012

(65) Prior Publication Data
US 2014/0065503 A1  Mar. 6, 2014

(30) Foreign Application Priority Data
Feb. 2, 2011 (FR) ...................................... 11 50825

(51) Int. Cl.
*H01M 8/04* (2006.01)
(52) U.S. Cl.
CPC ...... *H01M 8/04007* (2013.01); *H01M 8/04253* (2013.01); *H01M 8/04268* (2013.01); *H01M 8/04358* (2013.01); *H01M 8/04544* (2013.01); *H01M 8/04768* (2013.01); *Y02E 60/50* (2013.01)

(58) Field of Classification Search
CPC ..................... H01M 8/04007; H01M 8/04253; H01M 8/04268; H01M 8/04358; H01M 8/04544
See application file for complete search history.

(56) References Cited

U.S. PATENT DOCUMENTS

2003/0031905 A1  2/2003  Saito
2010/0167146 A1  7/2010  Takeguchi et al.

FOREIGN PATENT DOCUMENTS

| EP | 0074701 A1 | 3/1983 |
| JP | 2001229947 A | 8/2001 |
| JP | 2004063118 A | 2/2004 |
| JP | 2005322596 A | 11/2005 |
| JP | 2009245802 A | 10/2009 |

OTHER PUBLICATIONS

International Search Report corresponding to application PCT/FR12/50221 dated May 21, 2012.
Written Opinion corresponding to application PCT/FR12/50221 dated Aug. 2, 2013.

*Primary Examiner* — Helen O Conley
(74) *Attorney, Agent, or Firm* — Polster, Lieder, Woodruff & Lucchesi, L.C.

(57) ABSTRACT

The invention relates to a cooling system for a fuel cell, comprising a main heat-transfer-fluid circuit including a circulation pump (6) and a heat exchanger (8) with the exterior, which feed an upstream pipe (12) supplying the fluid to the cells (4) of the fuel cell, said fluid leaving the cells via a downstream pipe (14) in order to return to the main pump. The invention is characterized in that the main circuit comprises a three-port controlled valve (10, 16) on each upstream (12) and downstream (14) pipe, the third available port (10c) of the upstream pipe (12) being connected to the inlet of the pump (6) and the third available port (16c) of the downstream pipe (14) being connected to the outlet of the pump in order to establish a secondary fluid circuit.

9 Claims, 1 Drawing Sheet

COOLING SYSTEM FOR A FUEL CELL

CROSS-REFERENCE TO RELATED APPLICATIONS

This application is the US National Stage under 35 U.S.C. §371 of International Application Number PCT/FR2012/050221 filed on Feb. 1, 2012 which claims priority to French Application No. 1150825 which was filed on Feb. 2, 2011.

BACKGROUND

The present invention relates to a cooling system for a fuel cell that generates electricity and also relates to a method of operation of such a cooling system, as well as to an electricity-generating group and an automobile vehicle comprising a fuel cell equipped with this cooling system.

Fuel cells are developed today in particular for equipping vehicles as a replacement for internal combustion engines and they permit obtaining a better yield of energy than that of internal combustion engines by producing electricity used by an electrical traction machine.

Fuel cells generally comprise a stack of elementary cells comprising two electrodes separated by an electrolyte, and two conductive plates that supply the fuel and the oxidizer to the electrodes by internal conduits. The electrochemical reactions that take place upon contact with the electrodes generate an electric current and produce water while releasing a heat energy that heats the different components.

In order to function correctly the fuel cells must be at a certain temperature range, depending on the type, between 60 and 800° C. The heat released by the starting of the reactions when the cell is cold serves, at first, to heat the cells in order bring them to the desired operating temperature.

In order to regulate the temperature of the cells, the fuel cells comprise a cooling system comprising a heat-conveying fluid circuit put in circulation by a pump that comes in contact with these cells in order take on heat while heating up. The fluid then circulates in a heat exchanger in order to cool down, in particular by exchange with the ambient air.

A problem that is posed in the case of a starting of the fuel cell that is at a temperature lower than 0° C. is that the water produced by the electrochemical reaction is at risk of freezing as long as this temperature is below this threshold of 0° C. The fuel cell can then not function correctly and risks being destroyed.

In order to remedy this problem a known cooling system presented in particular in the document EP-A1-0074701 comprises a cooling circuit comprising a first circulation loop with the heat exchanger and a pump that always pumps in the same direction, and a second circulation loop that traverses the cells.

The two circulation loops intersect at a single point at the level of a four-way valve that can be placed in two positions. Two of the four channels always serve as one for the entrance and the other for the exit for the first circulation loop, and the two other channels allow the second loop to be arranged in series with the first loop in order to receive a circulation in one direction for one position of the valve and in the other direction for the other position.

While the pump is delivering in the first loop in a continuous manner in one and the same direction an automatic actuation of the four-way valve from one position to the other allows the direction of the passage of the heat-conveying fluid to be alternated in the second loop and therefore in the cells.

Thus, a cold frequent alternating of the direction of the circulation of the fluid in the cells is realized with a circulation of the same reduced volume of fluid traversing these cells in one direction then in the other direction. The same volume of fluid exits on one side of the cells as a function of the discharge of fluid and of the frequency of alternation in order to reenter thereagain after the changing of the direction of circulation.

The implementation of a low volume of fluid comprising an alternating movement allows obtaining a good uniformity of the temperature at all points of the cells and between the cells situated at the center of the stack and those at the ends by the fluid that exchanges and distributes the heat, as well as a concentration of the heat that remains in the cells and in the parts of the conduits close to these cells as the fluid does not circulate beyond these close parts.

Thus, a more rapid starting and rise of temperature of the fuel cell can be obtained before having to dissipate heat to the outside by the continuous manner of operation comprising a single direction of flow in which the fluid traverses the cells and passes into the heat exchanger in order to cool down.

A problem that is posed with this cooling circuit is that it requires a four-way valve that is relatively complex and expensive to produce. Moreover, the two loops intersecting at a single point form a specific circuit is not always easy to achieve in a simple manner starting from a conventional circuit comprising a single main loop.

SUMMARY

A simple and efficacious cooling circuit for a cooling system is disclosed that avoids the disadvantages of the prior art and that permits a rapid starting of the fuel cell at low temperatures, that is to say, lower than 0° C.

The cooling system for a fuel cell comprising a main circuit for heat-conveying fluid comprising a main circulation pump and a heat exchanger with the outside that feeds an upstream conduit delivering this fluid to the cells of the fuel cell, which fluid exits from the cells via a downstream conduit in order to return to the circulation pump. The main circuit comprises on each upstream and downstream conduit a controlled three-way valve, whereby the third port available in the upstream conduit is connected to the entrance of the pump and that the third port available in the downstream conduit is connected to the pump output in order to establish a secondary fluid circuit.

One advantage of this cooling system is that by using two simple and economical three-way valves that can be readily arranged in the loop of a conventional circuit, and by switching them simultaneously, the direction of circulation of the fluid in the cells can be made to alternate while the pump continues to pump in the same direction (i.e., without changing the direction of the pump).

The cooling system can furthermore comprise one or more of the following characteristics that can be combined with each other.

The upstream conduit and the downstream conduit each advantageously comprise a temperature sensor arranged close to the connection with the cells.

The three-way valves are advantageously valves controlled simultaneously, in an all or nothing manner.

A method for operating a cooling system is also disclosed which comprises any one of the previous characteristics. The method controls the frequency of alternations of the simultaneous switching of the two three-way valves in order to establish the secondary circuit or reestablish the main circuit as a function of operating parameters of the fuel cell.

The maximum frequency of the alternations is basically equal to twice the output delivered by the pump divided by the volume of the fluid put in operation between two temperature sensors arranged close to the connection of the conduits with the cells.

According to one mode of operation of the method, the frequency of alternation is determined as a function of the development of the temperature of the cells.

According to another mode of operation of the method, the frequency of alternation is determined for a given intensity of current delivered by the cells as a function of the development of the voltage on the terminals of these cells.

When the voltage delivered by the cells drops with cells being overheated, the frequency of alternation is advantageously reduced and when the voltage rises, the frequency of alternation is increased.

An electricity-generating group with a fuel cell can be provided with the disclosed cooling system which comprises any one of the previous characteristics.

Furthermore, an electric vehicle with a fuel cell delivering an electric current used for traction can be provided with a the disclosed cooling system which comprises any of the previous characteristic.

DESCRIPTION OF THE FIGURES

The invention will be better understood and other characteristics and advantages will appear more clearly from a reading of the following description given by way of example with reference made to the attached drawings in which.

DETAILED DESCRIPTION

Figure 1:
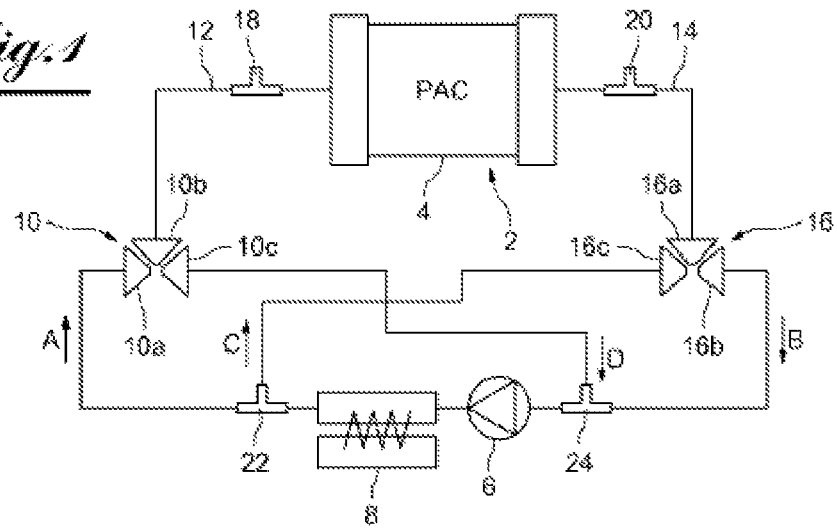
FIG. 1 is a diagram of a cooling system for a fuel cell.

FIG. 1 shows a fuel cell 2 comprising a series of cells 4 traversed by a heat-conveying fluid of a cooling system managed by a computer (not shown) controlling the cooling system, which can be the control computer for the fuel cell unit.

The cooling system comprises in a main circuit a pump 6 comprising a single direction of rotation and generating a delivery of heat-conveying fluid that traverses a heat exchanger 8 in order to cool this fluid by exchange of heat with another fluid, for example, with the ambient air.

In a mode of continuous operation of the cooling system, the heat-conveying fluid put in circulation by the pump 6 runs through a main circuit whose output is indicated by the arrow A and traverses an upstream three-way valve 10 by entering through the entrance port 10a in order to exit through the exit port 10b that conducts this fluid to the upstream conduit 12 of the cells 4 of the fuel cell.

The heat-conveying fluid then leaves the cells 4 through a downstream conduit 14 and traverses a three-way upstream valve 16 by entering through the entrance pot 16a and exiting through the exit port 16b that conducts this fluid toward the end of the main circuit indicated by the arrow B in order to return to the pump 6.

Each conduit 12, 14 connected to the cells 4 comprises a temperature sensor 18, 20 of the heat-conveying fluid that is arranged very close to these cells.

The sensor arranged in the upstream conduit 12 is preferably spaced from the entrance of the cell at a distance less than 1/10 of the length of the cell. Also, the sensor arranged in the downstream conduit 14 is spaced from the exit of the cell at a distance less than 1/10 of the total length of the cell.

Thus, a main circuit is obtained comprising a single direction of circulation that permits, in a normal operation mode, the taking of heat in the cells 4 in order to release the heat removed from the cells 4 by the heat-conveying fluid in the heat exchanger 8.

In the case of starting the fuel cell at temperatures lower than 0° C. and in order to accelerate the temperature rise of the cells in order to avoid a freezing of the water produced by the electrochemical reaction, the control computer of the cooling circuit maintains the rotation of the pump 6 in order to make it pump continuously and simultaneously controls the two three-way valves 10, 16 in accordance with small, successive periods in order to put them alternatively in the position of forming the main circuit as indicated above, then into a position forming a secondary circuit, as described below.

In order to establish the secondary circuit of the heat-conveying fluid, the two three-way valves 10, 16 are each switched into a second position using their third port.

It will be noted that the three-way valves 10, 16 are valves that are simultaneously controlled in an all or nothing manner that requires a simple and economical control.

When the three-way valves 10, 16 are switched, the heat-conveying fluid exiting from the heat exchanger 8 passes through the first connection 22 following the beginning of the secondary circuit indicated by the arrow C in order to feed the third port 16c of the downstream valve 16, then leaves again through the entrance port 16a in order to return into the cells 4 through the downstream conduit 14.

Then, the heat-conveying fluid exiting from the cells 4 through the upstream conduit 12 feeds the exit port 10b of the upstream valve 10, then leaves again through the third port 10c in order to arrive at the end of the secondary circuit indicated by the arrow D at a second connection 24 connected to the entrance of pump 6.

Thus, this results in a secondary circuit that allows the heat-conductive fluid to be circulated in the cells 4 in the opposite direction with a minimum of modifications to a conventional main circuit by adding two simple and economical three-way valves 10, 16 and while preserving the same direction of rotation of the pump 6.

For the alternating operating mode comprising the reversal of direction of circulation of the heat-conveying fluid into the cells 4 by simultaneously switching the two three-way valves 10, 16, the instantaneous output is the same as that of the continuous operating mode, which is calculated for being able to cool the cells 4 functioning at their maximum power. Moreover, this output takes into account the viscosity of the heat-conveying fluid and its density so that the mixture between the hot fluid and the cold fluid can be made in the cells in such a manner as to obtain a good exchange of heat and a uniformity of the temperatures.

The cooling system enables the heat-conveying fluid to circulate alternatingly in the fuel cell in the two possible directions while nevertheless operating the pump to continuously pump in the one direction in order to exploit the heat produced by the cell itself during a cold start.

To this end the direction of circulation of the fluid inside the cell is alternated by alternatingly stressing the main circuit and the secondary circuit with a variable frequency adapted to the development of the temperature of the heat-conveying fluid or any other operating parameter representative of this temperature.

The frequency varies according to the two following initial phases:
- at the beginning of the start of the fuel cell, the frequency of alternation is elevated in such a manner that the thermal energy dissipated by the electrochemical reaction heats as rapidly as possible a minimum volume of heat-conveying fluid, which elevated alternating frequency allows practically the same fluid to be maintained inside the cell that, as soon as an end of the cell has been reached, is redirected in the inverse direction toward the opposite end,
- after this first phase of the heating of this small amount of fluid, the frequency of alternation is progressively reduced in order to avoid an overheating of the cell and in order to propagate the heat accumulated by the small amount of fluid to the rest of the circuit.

More precisely, during the first phase of the elevated alternating frequency, during the cold start of the fuel cell, a fluid volume that is sufficiently reduced is obtained that traverses the cells 4 and that is implemented in the heat exchangers. The reduced fluid volume shifts and exits from the cells remaining close to these cells on both sides in the upstream conduits 12 and downstream conduits 14 in such a manner as to minimize the fluid mass to be heated as well as the heat exchange with the outside.

Furthermore, this volume of fluid used should allow the fluid situated in the central cells 4, i.e., those that heat up the most, to reach the temperature sensors 18, 20 at the end of the movement so that they can follow the development of the temperature of these central cells. In this case a maximum alternating frequency F (in Hertz) that is equal to twice the output D (in liter/second) of the pump divided by the volume of the fluid V (in liters) used between the two temperature sensors 18, 20.

The invention thus allows the even reheating of the cells 4 to a temperature greater than 0° C. before the quantity of water delivered by these cells has saturated the electrolyte in order to avoid a freezing of this water not absorbed by this electrolyte.

A first method for controlling the frequency of the alternations of the direction of the circulation of the heat-conveying fluid during the rise of the temperature of the cells 4 is made from monitoring the temperatures indicated by the sensors 18, 20.

A too great an elevation of this temperature is limited by the drop of the frequency of the alternation during the second initial phase, that then implements a greater and greater volume of fluid by taking cold fluid from the rest of the circuit. In other words, the increase of the temperature gradient is controlled by that of the frequency of the alternation.

Finally, a nominal operating temperature of the cells 4 is achieved comprised, for example, between 20 and 80° C. for a fuel cell with a solid, polymeric electrolyte, and in particular comprised between 60 and 80° C. for vehicle applications, at a zero frequency of alternation, which is the continuous operating mode using the main circuit. Heat-conveying fluid is obtained with this continuous passage mode in the cells 4 and then in the heat exchanger 8, which allows the greatest exchange of calories.

Figure 2:
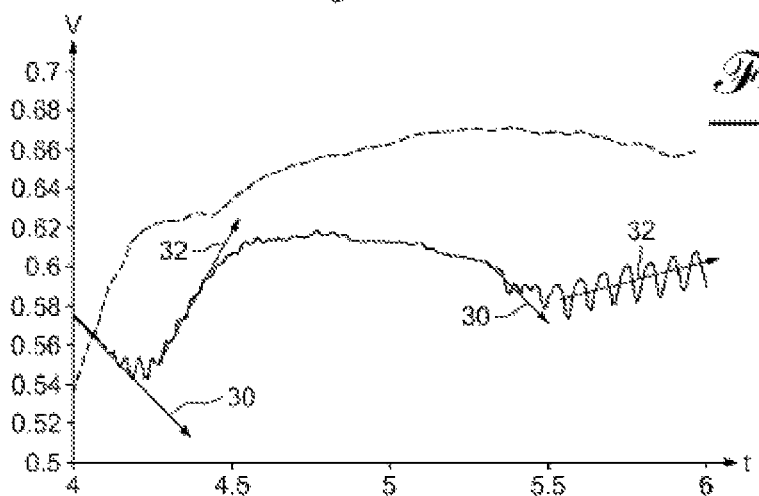
FIG. 2 is a graph showing the developments of the electrical voltage V on the terminals of the cells of this fuel cell, presented on the y-axis as a function of the time t presented on the x-axis during a regulation by an alternating circulation of the fluid.

FIG. 2 illustrates a second method of regulating the temperature of the cells 4 starting from cells delivering a given current intensity by monitoring the level of voltage V in volts of these cells as a function of the time t in seconds, preferably measured on the central cells, that are those that heat up the most rapidly.

After a lowering of voltage V as indicated by the arrows 30, which indicates an overheating of the cells 4 due to the first initial phase, during the second initial phase the frequency of alternation is reduced, which passes approximately to 14 Hertz in order to increase the volume of fluid implemented and reduce the temperature of this fluid.

After these two initial phases and after a rise of voltage V as indicated by the arrows 32, which indicates a cooling of the cells 4, the frequency of alternation is increased, which passes to approximately 28 Hertz in order to reduce the volume of fluid implemented and to raise the temperature of this fluid.

Before a start at a temperature lower than 0° C., the cell must be dried beforehand in such a way that the water produced during the starting is absorbed by the electrolyte and that the temperature of the cells is greater than 0° before the electrolyte is saturated with water. Also, during a start at a temperature lower than 0° C. the cell must be fed with dry reactive gases. The state of the advance drying of the cell implies an internal resistance value greater than the nominal value, which necessitates adapting the density value of the current during the starting. This can be applied in the form of a gradient increasing in intensity in order to limit the stress on all the first instants of the starting and to then arrange the maximum thermal and electrical power.

Figure 3:
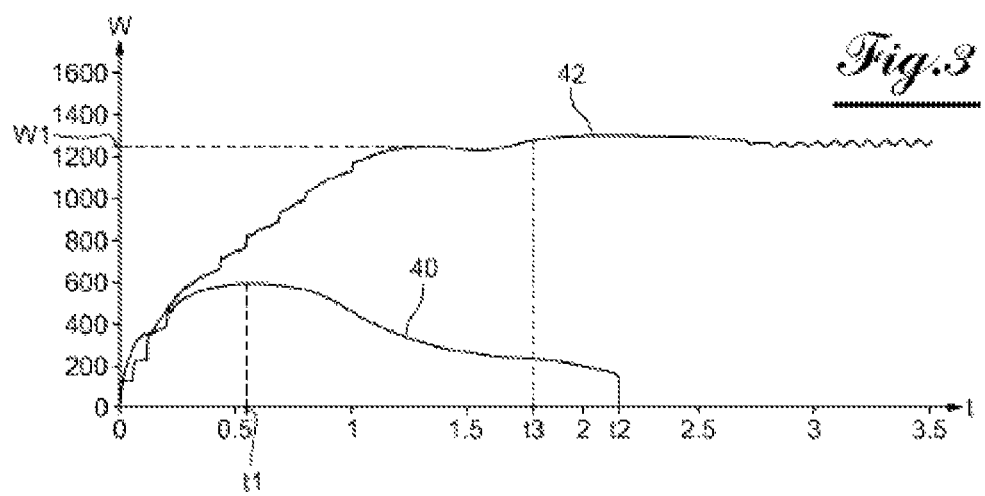
FIG. 3 is a graph comparing the start at a low temperature of a fuel cell with and without the invention.

FIG. 3 shows the curve 40 of the electrical power W in watts as a function of the time t in seconds deliverable for a fuel cell comprising a cooling system without an alternating operating mode and which starts with an initial temperature of −8° C. The available power W rises at first, then rapidly drops at the time t1 in order to finish by being cancelled out at the time t2 on account of the saturation of the electrolyte by water, which begins to freeze.

The curve 42 of electrical power W that can be delivered for a fuel cell comprising a cooling system with an alternating operating mode and a regulation of the frequency of alternation presented above, that starts with an initial temperature of −25° C., has a regular rise of the available power, then, at time t3 a stabilization of this power at the value W1, which can be maintained for several minutes.

It is noted that with the cooling system an available power that is clearly higher and that can be maintained is obtained for a start with temperatures that are very much lower.

The fuel cell comprising a cooling system as described above can serve for an automobile but also for all stationary applications, such as an electricity-generating group, for which a rapid temperature rise is sought.

The invention claimed is:

1. A method for operating a cooling system for a fuel cell; the cooling system comprising a main circuit of heat-conveying fluid comprising a circulation pump and a heat exchanger that feeds an upstream conduit delivering the fluid to cells of the fuel cell, which fluid exits from the cells via a downstream conduit in order to return to the circulation pump, the main circuit comprising a controlled three-way valve on each of the upstream and downstream conduits, whereby a third port of the valve in the upstream conduit is connected to an entrance of the pump and a third port of the valve in the downstream conduit is connected to an outlet of the pump in order to establish a secondary fluid circuit, wherein the upstream conduit and the downstream conduit each comprise a temperature sensor that is positioned close to connections of the upstream and downstream conduits with the cells; wherein the method comprises a step of varying, as a function of operating parameters of the fuel cell, the frequency (F) of alternations of simultaneous switching of the two three-way valves in order to establish the secondary circuit or reestablish the main circuit, with an elevated frequency at the starting of the cell in such a manner as to minimize the mass of fluid to be heated, then a low alternating frequency in order to limit too great an elevation of the heated fluid;

wherein the maximum frequency of the alternations (F) is essentially equal to twice the output (D) delivered by the pump divided by the volume of fluid (V) used between two temperature sensors arranged close to the connection of the conduits with the cells.

2. The method according to claim 1, wherein the three-way valves are simultaneously controlled to reverse the direction of flow of fluid through the fuel cell.

3. The operating method according to claim 1, wherein the frequency of alternation (F) is determined as a function of the development of the temperature of the cells.

4. The operating method according to claim 1, wherein the frequency of alternation (F) is determined for a given intensity of current delivered by the cells as a function of the development of the voltage (V) on the terminals of these cells.

5. The operating method according to claim 4, wherein when the voltage (V) delivered by the cells drops with cells being overheated, the frequency of alternation (F) is reduced and when the voltage (V) rises, the frequency of alternation is increased.

6. An electricity-generating group with a fuel cell comprising a cooling system controlled by the operating method of claim 1.

7. An electric vehicle with a fuel cell delivering an electric current used for traction, wherein the vehicle further includes a cooling system for the fuel cell, wherein the cooling system is controlled in accordance with the method of claim 1.

8. The operating method according to claim 1, wherein the frequency of alternation (F) is determined as a function of the development of the temperature of the cells.

9. The operating method according to claim 1, wherein the frequency of alternation (F) is determined for a given intensity of current delivered by the cells as a function of the development of the voltage (V) on the terminals of these cells.

\* \* \* \* \*